(12) United States Patent
Smith (10) Patent No.: US 6,988,658 B2
(45) Date of Patent: Jan. 24, 2006

(54) SYSTEM AND METHOD FOR FACILITATING A TRANSACTION BETWEEN A MERCHANT AND A CONSUMER

(75) Inventor: Gerald W. Smith, Clayton, NJ (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

(21) Appl. No.: 10/439,617

(22) Filed: May 16, 2003

(65) Prior Publication Data

US 2004/0226995 A1 Nov. 18, 2004

(51) Int. Cl.
*G06K 15/00* (2006.01)
(52) U.S. Cl. ............ 235/383; 235/380; 235/381; 235/382; 235/451; 705/39; 705/41
(58) Field of Classification Search ........... 235/383, 235/381, 382, 385, 451, 487, 492, 380; 705/39, 705/41
See application file for complete search history.

(56) References Cited

U.S. PATENT DOCUMENTS

| | | | |
|---|---|---|---|
| 5,239,167 A | | 8/1993 | Kipp |
| 5,250,789 A | * | 10/1993 | Johnsen ............ 705/14 |
| 5,418,354 A | | 5/1995 | Halling et al. |
| 5,426,423 A | | 6/1995 | Raimbault et al. |
| 5,540,301 A | | 7/1996 | Dumont |
| 5,543,607 A | | 8/1996 | Watanabe et al. |
| 5,594,228 A | | 1/1997 | Swartz et al. |
| 5,640,002 A | | 6/1997 | Ruppert et al. |
| 5,729,697 A | * | 3/1998 | Schkolnick et al. ........ 705/23 |
| 5,825,002 A | * | 10/1998 | Roslak ............ 235/375 |
| 5,992,570 A | | 11/1999 | Walter et al. |
| 6,032,127 A | | 2/2000 | Schkolnick et al. |
| 6,073,840 A | | 6/2000 | Marion |
| 6,167,381 A | | 12/2000 | Swaine et al. |
| 6,179,206 B1 | | 1/2001 | Matsumori |
| 6,189,789 B1 | | 2/2001 | Levine et al. |
| 6,195,006 B1 | | 2/2001 | Bowers et al. |
| 6,315,199 B1 | | 11/2001 | Ito et al. |
| 6,325,284 B1 | * | 12/2001 | Walker et al. ............ 235/380 |
| 6,327,576 B1 | | 12/2001 | Ogasawara |
| 6,435,407 B1 | | 8/2002 | Fiordelisi |
| 6,484,939 B1 | | 11/2002 | Blaeuer |
| 6,513,015 B2 | * | 1/2003 | Ogasawara ............ 705/26 |
| 6,764,001 B1 | * | 7/2004 | Kawai et al. ............ 235/380 |
| 2002/0052839 A1 | | 5/2002 | Takatori |
| 2002/0079367 A1 | | 6/2002 | Montani |

* cited by examiner

*Primary Examiner*—Steven S. Paik
(74) *Attorney, Agent, or Firm*—Snell & Wilmer (57) ABSTRACT

A system for facilitating a transaction between a merchant and a consumer includes a consumer interface and a settlement administrator. The consumer interface is configured to emit a consumer identity signal configured to identify a consumer, and the settlement administrator is configured to receive the consumer identity signal and to receive an amount owing signal indicative of an amount owing from said consumer. The settlement administrator is further configured to facilitate one or more payments between an account of the merchant and an account of the consumer upon receipt of the consumer identity signal and the amount owing signal. In addition, the system may include an incentive administrator configured to emit an offer signal indicative of an incentive offer. The incentive administrator may be configured to receive the consumer identity signal so that the incentive offer may be based at least in part on the consumer identity signal.

15 Claims, 2 Drawing Sheets

SYSTEM AND METHOD FOR FACILITATING A TRANSACTION BETWEEN A MERCHANT AND A CONSUMER

FIELD OF INVENTION

The present invention generally relates to systems and methods for administering transactions between merchants and consumers, and more specifically, to systems for recognizing and tracking the actions of a consumer to facilitate transactions between a consumer, a merchant and a financial service provider.

BACKGROUND OF THE INVENTION

In today's world, a variety of systems have been developed to efficiently distribute goods and/or services from producers and providers of those goods and/or services to their end users. In addition, many systems have been developed to facilitate distribution of revenues from those end users to each of the parties involved in producing, providing, and distributing the goods and services. Traditionally, producers of goods may manufacture their products in large quantities and store them in one or more warehouses. Various distributors may then collect selected goods from the warehouses of various manufacturers and transport those selected and collected goods to merchants (e.g., supermarkets, shopping centers, convenience stores, or other retail establishments). In turn, consumers may travel to the merchants' facilities, load shopping carts with their selected items, and proceed to a checkout lane to enable a clerk to generate an inventory of the selected items.

Based on that inventory, the clerk and the consumer may then settle the transaction by effecting a settlement such as a payment (e.g., transfer of cash, commercial paper, electronic funds transfer, credit transaction, and/or debit transaction). Depending upon the form of settlement, the parties involved in producing, providing, and distributing those goods and services may then transfer and/or distribute funds among themselves to settle each of their contributions to the process.

In conjunction with the distribution of goods and services from suppliers to consumers, and the compensating flow of revenues from consumers to both suppliers and distributors, a variety of difficulties, inconveniences, and/or inefficiencies may be encountered as each of the parties attempts to accomplish their individual objectives. For example, as a consumer proceeds through a retail establishment (e.g., a grocery store), the consumer is typically required to first locate the items the consumer wishes to purchase, and to then transport those items to a checkout location. Unfortunately, it can be cumbersome and time consuming for the consumer to locate the section of the store (e.g., the dairy aisle, the dry cereal aisle) where the items the consumer desires (e.g., milk, oatmeal) are located, to find the most efficient path between each of those locations, and to transport all of the collected items to a checkout line. Where the consumer's shopping list contains many items, particularly when the list was prepared by a person other than the consumer, locating each of the items on the list may be time consuming and inefficient, involving many trips back and forth throughout the store as the consumer proceeds through the list.

From the perspective of the merchant, it may be desirable to make the task of shopping more efficient, convenient, and satisfying for the consumer. It may also be desirable to increase sales by presenting individuals with an increased number of choices in specific areas, by increasing the effectiveness of incentive offerings, and by reducing the impact and/or occurrence of undesirable events such as abandonment (i.e., a potential buyer's act of failing to complete a purchase), return (i.e., a buyer's act of returning previously purchased goods for a refund), and remorse (i.e., a buyer's dissatisfaction subsequent to a completed purchase).

Similarly, from a supplier's perspective, it may also be desirable to improve the consumer's shopping experience and to increase the volume of sales in many of the same ways as the merchant, but it may also be desirable to acquire information about consumer behavior and their actions in response to specific stimuli. For example, suppliers of goods may wish to test the effectiveness of specific targeted offers, which may be tailored to individual consumers and/or identifiable environmental conditions. In addition, it may be desirable to improve the ability of suppliers and other participants in the supply chain (e.g., raw material suppliers, manufacturers, producers, wholesalers, distributors, truckers, financiers, investors) to easily and quickly collect and access information regarding the flow of goods and services to consumers. Such information may be useful to effectively test various marketing and/or distribution tactics and may also be useful in effectively managing production and distribution to reduce necessary inventories.

Although it may be a goal of most or all participants in the supply chain to improve the consumer's shopping experience, several aspects of the traditional shopping process may detract from this goal. For example, once a consumer has traveled to the merchant's facility, located and collected all of the desired goods, and transported them to a checkout, the consumer typically then waits in a line before the consumer's selections may be inventoried and his/her purchase completed. At this checkout phase of the merchandizing process, delays may be encountered due to the volume of items being purchased by other patrons, the number of other patrons in line in front of the consumer, or inefficiencies in conducting the checkout by the other consumers and/or the clerk. Such inefficiencies in conducting checkout may occur during any of the processes to be accomplished by the consumer and the clerk. These processes may include any or all of the steps of inventorying the items in the consumer's shopping cart; determining a price associated with each item; applying any coupons, discounts or other incentive offerings; determining a subtotal; adding any applicable state or local taxes or other surcharges to the subtotal; presenting the consumer with a total amount due; receiving from the consumer a form of payment; verifying the identity of the consumer; obtaining an authorization of a guarantor or third party provider of financial services; obtaining the consumer's signature; processing the payment; providing a receipt to the consumer; and/or clearing the consumer's selected goods from the checkout area.

When the procedures associated with checkout have been completed, the clerk or another agent of the merchant may be required to perform additional processes such as, for example, ordering more goods to replace those purchased by the consumer, sending payments to any merchants whose goods may have been on consignment and for which payment is now made, seeking payment from the credit card company or other financial institutions where redemption of commercial paper or other payment means is to be made, tracking purchases made by the consumer, and collecting other desired information such statistics relating to offers presented to, declined by, or accepted by the consumer.

In addition to the impediments described above, traditional systems may facilitate collection of only limited information concerning the consumer's preferences and purchasing habits and may not make such information readily available to merchants or other supply chain participants. Similarly, it may not be convenient to collect and/or store information regarding the path traversed by consumers within specific merchant facilities or the length of time consumers spend in particular locations in those facilities—at least not in a manner that would facilitate appropriate dissemination and/or use of such information. Accordingly, assumptions must be made as to the most optimum paths in which to arrange the store and the most advantageous placement of goods and displays (e.g., incentive presentations and the like) within each facility.

For the purpose of modifying consumer behavior, merchants often present incentive offerings to potential consumers via newspaper ads or radio and television advertisements. Sometimes advertisements are directly mailed to a consumer's home address. Accordingly, such incentive offerings are frequently presented to consumers when they are physically separated from the goods or services being incented (e.g., at home watching television or reading a newspaper, in a car listening to a radio). As a result, consumers perceiving, and desiring to take advantage of, incentive offerings typically travel to a merchant's store, locate the specific item associated with the incentive offering, and present, or otherwise reference, the incentive offering upon checkout. Further, incentive offers presented in the form of printed coupons may be cumbersome for a consumer to manage and track, making them less effective in modifying consumer behavior.

More recently, merchants have attempted to provide coupons to consumers directly in merchant facilities where the obstacles between the perception and the acceptance of an incentive offer (e.g., the purchase of an incented item) may be completed. For example, current systems may be configured to provide a booklet of coupons or a coupon dispenser in close proximity to the incented items. However, difficulties have arisen with these types of systems where people consume the coupons without actually purchasing the product. For example, coupons are often wasted, discarded, and/or lost. Children may take multiple coupons without purchasing the incented items. Moreover, no system or method currently exists for tracking coupons as they are collected by the consumer (e.g., the identity of the consumer, the time of the dispensed coupon, what other items were purchased by the consumer, or other information that may be useful to a merchant distributing coupons).

Accordingly, it would be advantageous to have a system and method for facilitating a transaction between a merchant and a consumer wherein improvements in store layout, offers presented, pricing, inventory management, and payment reconciliation may be provided.

SUMMARY OF THE INVENTION

The present invention provides a system and method for facilitating a transaction between a merchant and a consumer. The system includes a consumer interface and a settlement administrator. The consumer interface is configured to emit a consumer identity signal that is further configured to identify a consumer. The settlement administrator is configured to receive the consumer identity signal and to receive an amount owing signal indicative of an amount owing from said consumer. Finally, the settlement administrator is configured to facilitate one or more payments between an account of the merchant and an account of the consumer upon receipt of the consumer identity signal and the amount owing signal.

In an exemplary embodiment, the amount owing signal received by the settlement administrator may be indicative of an inventory of purchases of the consumer. In accordance with this embodiment, the settlement administrator may be configured to determine an amount owing based at least in part on that inventory.

In an exemplary embodiment, the system may include an incentive administrator configured to emit an offer signal indicative of an incentive offer. The incentive administrator may be configured to receive the consumer identity signal and to emit an offer signal indicative of an incentive offer that is based at least in part on the consumer identity signal.

In another exemplary embodiment, the consumer interface may be configured to receive and retain an offer signal indicative of an incentive offer. In accordance with this embodiment, the consumer interface may be further configured to emit the offer signal to be received, for example, by the settlement administrator. Accordingly, the settlement administrator may be configured to receive an offer signal indicative of an incentive offer and to facilitate one or more payments between an account of the merchant and an account of the consumer where the one or more payments are based at least in part on the offer signal.

In an exemplary embodiment, the system may also include a merchandizing administrator in communication with the settlement administrator and the incentive administrator. In accordance with this embodiment, the settlement administrator may be configured to provide merchandising information to the merchandising administrator and the merchandising administrator may be configured to receive such merchandising information and to provide incentive information to the incentive administrator such that the incentive offer may be based at least in part on the merchandizing information.

In a further aspect, the present invention provides a method for facilitating a transaction between a merchant and a consumer. In accordance with an exemplary embodiment, a method includes the steps of providing a consumer interface configured to emit a consumer identity signal configured to identify a consumer, receiving said consumer identity signal, receiving an amount owing signal indicative of an amount owing from said consumer; and facilitating one or more payments between an account of the merchant and an account of the consumer.

BRIEF DESCRIPTION OF EXEMPLARY DRAWINGS

The above-mentioned objects and features of the present invention can be more clearly understood from the following detailed description considered in conjunction with the following drawings, in which like numerals represent like elements and in which.

DETAILED DESCRIPTION OF EXEMPLARY EMBODIMENTS

As more fully explained herein, the present invention provides a system and method for facilitating a transaction between a merchant and a consumer. In an exemplary embodiment, the system includes a consumer interface and a settlement administrator wherein the consumer interface is configured to emit a consumer identity signal configured to identify a consumer, and the settlement administrator is configured to receive both the consumer identity signal and an amount owing signal indicative of an amount owed by the consumer. The settlement administrator may also be configured to facilitate one or more payments between an account of the merchant and an account of the consumer upon receipt of the consumer identity signal and the amount owing signal.

In an exemplary embodiment, the amount owing signal received by the settlement administrator may be indicative of an inventory of purchases of the consumer, and the settlement administrator may be configured to determine an amount owing based at least in part on that inventory.

In another exemplary embodiment, the system may include an incentive administrator configured to emit an offer signal indicative of an incentive offer. Optionally, the incentive administrator may be configured to receive the consumer identity signal and to emit an offer signal indicative of an incentive offer that is based at least in part on that consumer identity signal.

In another exemplary embodiment, the consumer interface may be configured to receive the offer signal and to retain the incentive offer for use in conjunction with the checkout and settlement process. In accordance with this embodiment, the consumer interface may be further configured to emit the offer signal to be received, for example, by the settlement administrator. In a complementary manner, the settlement administrator may be configured to receive an offer signal indicative of an incentive offer and to facilitate one or more payments between an account of the merchant and an account of the consumer, where the one or more payments are based at least in part on the offer signal.

In yet an exemplary embodiment, the system may also include a merchandizing administrator in communication with the settlement administrator and the incentive administrator. In accordance with this embodiment, the settlement administrator may be configured to provide merchandising information to the merchandising administrator, and the merchandizing administrator may be configured to receive such merchandising information and to provide incentive information to the incentive administrator such that the incentive offer may be based at least in part on the merchandising information. It should be noted that such merchandizing information may also be transmitted to, received by, and used by any other parties in the supply chain.

Figure 1:
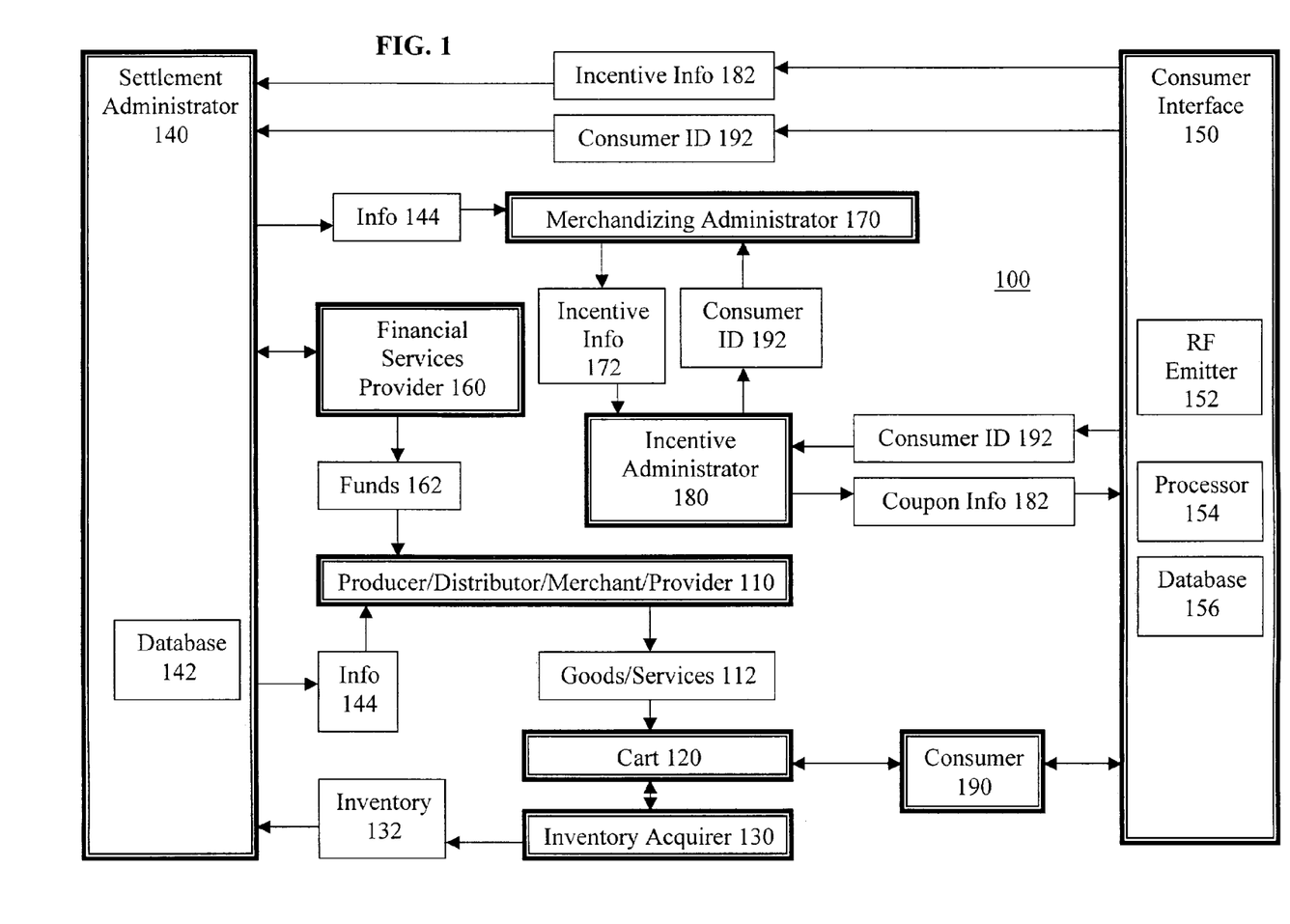
FIG. 1 illustrates the external flow of information surrounding an exemplary system for facilitating a transaction between a consumer and a merchant.

FIG. 1 illustrates the external flow of information surrounding an exemplary system 100 for facilitating a transaction between a consumer and a merchant. In accordance with this embodiment, system 100 comprises a consumer interface 150 and a settlement administrator 140. In this exemplary embodiment, participants in the supply chain 110, which may include one or more supplier, manufacturer, producer, distributor, warehouse, merchant, or other provider, supplies goods and/or services 112 to be placed in a cart 120 controlled by a consumer 190. In addition to controlling cart 120, consumer 190 also controls a consumer interface 150, which is configured to emit a consumer identity signal 192 that is configured to identify consumer 190.

In an exemplary embodiment, consumer interface 150 comprises an emitter 152 (e.g., radio frequency emitter, modulated light emitter, encoded sound emitter, electronic pulse emitter) that may be configured to emit signals providing appropriate information. As described above, such information may include a consumer identity, but such information may also comprise information collected by consumer interface 150, processed by a computer processor 154 associated with consumer interface 150, and/or stored in a database 156 associated with consumer interface 150. Such information may include data regarding incentive offers collected by consumer 190, time and location information concerning consumer 190, traits or characteristics of consumer 190, and the like. For more information related to radio frequency identification systems, see U.S. patent application Ser. No. 10/192,488, filed Jul. 9, 2002 and entitled System And Method For Payment Using Radio Frequency Identification In Contact And Contactless Transactions, which is hereby incorporated by reference.

In an exemplary embodiment, an inventory acquirer is in communication with a settlement administrator 140, which is configured to facilitate one or more payments among an account of consumer 190 and an account of one or more supply chain participant 110 to settle consumer's 190 purchase of goods/services 112 in cart 120. Inventory acquirer 130 examines the contents of cart 120 to determine an inventory 132. An exemplary inventory acquirer may be found in U.S. Pat. No. 5,418,354, owned by Leonard Halling, which generally discloses a self-service cart system which includes a bar code scanner, a security scanner and a magnetic card reader, the contents related to inventory acquisition is hereby incorporated by reference. The patent includes a cart having an electrically latchable door, a device for optically acquiring a price and description of a product, a security device for converting a tag on the product from an unsecured state to a secured state (e.g., magnetic to non-magnetic) and a controller for allowing access to the cart after acquiring the information. Another exemplary system is disclosed in U.S. Pat. No. 5,729,697, owned by IBM, the contents related to inventory acquisition is hereby incorporated by reference. The '697 patent generally discloses a shopping cart that automatically tracks objects that are selected and carried in the cart. The patent discloses a cart antennae which creates a radio frequency field within the shopping cart, an interrogator that interrogates radio frequency tags that are attached to an object in the shopping cart and a data structure in memory which includes an object price and a running total of the prices along with a memory on each radio frequency tag which includes paid information after the shopper pays the running total.

It should be noted that inventory 132 may comprise a monetary value, a set of quantities, item identities, and/or any other information sufficient to enable a determination of an amount owed by consumer 190 to settle the purchase of goods/services 112 in cart 120. Upon checkout or at any other appropriate interval, inventory acquirer 130 communicates inventory 132 to settlement administrator 140 to facilitate settlement of the transaction among participants 110 and consumer 190.

As suggested above, settlement administrator 140 is in communication with inventory acquirer 130 and is configured to receive inventory 132 and to determine an amount owing based at least in part on inventory 132. In an exemplary embodiment, settlement administrator 140 includes database 142, which may contain pricing, taxation, and/or incentive data for use in determine an amount owing by consumer 190 based at least in part on inventory 132. In addition, settlement administrator 140 is configured to receive consumer identity signal 192 transmitted by consumer interface 150.

Based on consumer identity signal 192 and the amount owing, settlement administrator may communicate with a financial services provider 160 to facilitate a transfer of funds 162, or another form or payment, among an account of consumer 190 and an account of one or more supply chain participant 110.

In an exemplary embodiment, system 100 also includes an incentive administrator 180 configured to emit an offer signal 182 indicative of an incentive offer. Optionally, incentive administrator 180 may be configured to receive consumer identity signal 192 and to select, adapt, configure, or otherwise modify offer signal 182 based at least in part on consumer identity 192. For example, in an exemplary embodiment, once consumer identity 192 is known by incentive administrator, attributes or characteristics of consumer 190 may be retrieved from one or more databases to be used as factors in configuring offer signal 182. Exemplary factors to be considered in configuring offer signal 182 may include consumer's 190 age, gender, purchasing history, time/duration and/or location/path occupied/traversed by consumer 190 inside and/or outside merchant's establishment, economic information regarding consumer 190 and/or population in general, or the like. Incentive administrator 180 may be preconfigured with incentive information or may be configured to receive incentive information 172 from a merchandising administrator 170.

In an exemplary embodiment, consumer 190 may obtain incentives outside the merchant location. For example, consumer 190 may interact with a self-service incentive administrator 180 that may be located in a common area of a school, shopping center, bus station or other place of public accommodation. In addition, consumer 190 may interact with incentive administrator 180 via a terminal or other suitable portal means for connecting to the Internet or another network.

For more information on incentive/loyalty systems, transaction systems, electronic commerce systems and digital wallet systems, see, for example, U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984 was filed on Dec. 20, 2001 by inventors Ariff, et al. and is entitled System And Method For Networked Loyalty Program; U.S. Continuation-In-Part patent application Ser. No. 10/010,947 was filed on Nov. 6, 2001 by inventors Haines, et al. and is entitled System And Method For Networked Loyalty Program; the Shop AMEX™ system as disclosed in Ser. No. 60/230,190 filed Sep. 5, 2000; the MR as Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a digital wallet system disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers disclosed in Ser. No. 09/800, 461 filed on Mar. 7, 2001, and also in related provisional applications Ser. No. 60/187,620 filed Mar. 7, 2000, Ser. No. 60/200,625 filed Apr. 28, 2000 and Ser. No. 60/213,323 filed May 22, 2000, all of which are hereby incorporated by reference.

As mentioned briefly above, settlement administrator 140 may also be configured to consider incentive information 182 in determining an amount owing by consumer 190. Such incentive information 182 may comprise a percentage discount, a two-for one, buy one get one free, or the like. Where incentive information 182 comprises an offer such as buy 10 and get one free, settlement administrator 140 may be configured to track purchase history so as to determine whether and/or when the condition has been satisfied. Accordingly, settlement administrator 140 may be configured to receive incentive information 182 transmitted by consumer interface 150 or another reliable source. Moreover, by virtue of its function of receiving inventory 132 as well as consumer identity signal 192 and incentive information 182, settlement administrator 140 is positioned to collect information that may be extremely useful in optimizing the merchandizing process from the perspective of consumer 190 and/or one or more supply chain participant 110. Accordingly, settlement administrator 140 may be configured to retain such inventory 132 as well as consumer identity signal 192 and incentive information 182 in database 142. Further, settlement administrator 140 may be configured to transmit such information 144 to one or more supply chain participant 110 or to merchandizing administrator 170.

It should be noted that in addition to incentive information 182, consumer interface 150 may also collect and transmit time and location information regarding the path traversed by consumer 190 within the merchant's facility. Such information may be acquired by consumer trackers situated at specific locations throughout the merchants facility. In one embodiment, consumer trackers emit location and/or time signals that are received and stored by consumer interface to be later downloaded by settlement administrator 140. In another embodiment, consumer trackers are configured to receive consumer identification signal 192 as consumer passes within a usable field of proximity from each consumer tracker. Each consumer tracker may then communicate such consumer proximity information to settlement administrator 140 and/or merchandizing administrator 170 for use in determining the path traversed by consumer 190. Accordingly, such information may be received and stored by settlement administrator 140 for latter transmission to, receipt by, and use by merchandizing administrator 170 in conjunction with information 144. Accordingly, merchandising administrator may use information 144 to determine how and where consumers 190 spend time within the facility. In addition, offerings may be modified in order to improve the shopping process from the perspective of consumer 190 and/or one or more of supply chain participants 110.

Merchandizing administrator 170 may be configured to communicate incentive information 172 to incentive administrator 180. In accordance with an exemplary embodiment, merchandising administrator 170 may also be configured to receive consumer identity 192 from incentive administrator for use in configuring incentive information 172 to be communicated to incentive administrator 180. In accordance with another exemplary embodiment, merchandising administrator 170 may be configured to receive collected merchandizing information 144 from settlement administrator 140 and to analyze such information 144 in order to improve the effectiveness of the merchandising process. For example, merchandizing administrator 170 may be configured to determine the effectiveness of offers presented to particular consumers 190 based on the responses of those consumers 190 as received through inventory 132. Accordingly, merchandising administrator 170 may be configured to formulate test incentive offerings to be communicated as incentive information 172 to incentive administrator 180 for presentation to consumer 190 as incentive information 182. It should also be noted that incentive information 182 may be specifically tailored for presentation to consumer 190 based on consumer identification signal 192. In addition to being configured to be received and stored by consumer interface 150, incentive information 182 may also be configured to trigger a corresponding presentation to be perceived by consumer 190. For example, the presentation to consumer may be configured as any combination of an emission of a printed advertisement, a display of a moving or static video image, a performance of a sound recording, or even an emission of a scent. Such offers may be configured for acceptance through an immediate act performed by consumer such as pushing a button, pulling a lever, orally responding to a prompt, remaining physically present in a location, proceeding to another predetermined location, or submitting to biometric authentication. Such offers may also be accepted through later acts such as purchasing an incented item.

In an exemplary embodiment, the information regarding which goods were selected by the user may be collected in a contactless method, e.g., using unique radio frequency emitters, wherein the consumer 190 merely pushes cart 120 within a field of proximity of inventory acquirer 130. In accordance with this embodiment, inventory acquirer 130 detects a unique radio frequency from each product 112, or from a tag on each product 112, accesses a database, and returns an inventory 132.

Accordingly, the system of the instant invention facilitates improvements in store layout, offers presented, pricing, inventory management, payment reconciliation. In addition the collection of that information provides a variety of other benefits such as the ability to provide monthly or even annual statements to consumer 190.

In on-line implementations of the instant invention, each participant is equipped with a computing system. Such computing units may be in the form of a personal computer, although other types of computing units may be used including laptops, notebooks, hand held computers, set-top boxes, and the like. A merchant may have a computing unit implemented in the form of a computer-server, although other implementations are possible. The settlement administrator, the merchandising administrator, the incentive administrator, the financial services provider, the inventory acquirer, and the supply chain participant, each may be implemented as a computer, which may be a main frame computer or which may be implemented in other forms, such as mini-computers, PC servers, a network set of computers, and the like.

The settlement administrator, the merchandising administrator, the incentive administrator, the financial services provider, the inventory acquirer, and the supply chain participant computers may be interconnected via a network, referred to as a settlement network. The settlement network represents a combination of existing proprietary networks and non-proprietary networks that presently accommodate transactions for credit cards, debit cards, and other types of financial/banking cards. The settlement network may be a closed network, assumed to be secure from eavesdroppers, and in an alternative embodiment, may include any open network, such as the internet. Examples of the settlement network include the American Express®, VisaNet® and the Veriphone® network.

In an exemplary embodiment, the system is implemented as computer software modules loaded onto the computers of the settlement administrator, the merchandizing administrator, the incentive administrator, the financial services provider, the inventory acquirer, and the supply chain participant. In an exemplary embodiment, the computers of the settlement administrator, the merchandizing administrator, the incentive administrator, the financial services provider, the inventory acquirer, and the supply chain participant do not require any additional software (beyond what is required to accomplish traditional on-line transactions) to participate in the online settlement transactions supported by the system. The additional facilitating software is implemented on the settlement administrator's computer, the financial service provider's computer, and/or the merchandising administrator's computer.

Although labeled as a "provider of financial services" or a "financial services provider," such party may represent other types of issuing institutions, such as credit card companies, card sponsoring companies, or third party issuers under contract with financial institutions. In addition to issuing financial instruments, a bank or value source may provide value comprising non-financial instruments such as loyalty points, rewards, or coupons. It is further noted that other participants may be involved in some phases of the transaction, such as an intermediary settlement institution, but these participants are not shown.

An "account number" or "consumer identifier," as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards or incentives card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data from itself to a second device. A consumer account number may be, for example, a sixteen-digit value source identifier such as a credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the consumer.

The present invention accommodates payment products from, for example, charge cards, credit cards, debit cards, gift cards, stored value cards, telephone cards, loyalty cards, financial accounts, electronic funds transfer accounts and/or the like as well as card issuers such as, for example, American Express, Visa, MasterCard or private cash companies such as InternetCash or Flooz, or even other vendors such as Microsoft, AOL, Yahoo, and the like to be used within an unmodified merchant network. Access to a merchant network with the consolidated account provides greater choice by the consumer regarding how they will pay for purchases, even if the consumer does not possess a specific payment product or any payment product at all.

The system also supports other payment forms that have evolved from, and are more prevalent, online. These other payment forms include, for example, subscription or recurring payments for renewable, sweep accounts, periodic services, as well as micro-payments for location-based (i.e., dispensing machines, parking meters, and the like) or digital rights management services such as those providing music and/or software. Management of the micro-payments may include aggregation for settlement with the merchant and transaction viewing by the consumer. In addition, the system facilitates integrated statementing and may be configured to draw funds from a designated source or set of sources into the consolidated account on a specified schedule. Alternatively, the designated source or set or sources could be scheduled to place funds into the consolidated account according to a predetermined schedule. In addition to scheduled value transfers, the system may be configured to accommodate condition-based triggers, which enable the system to respond to unanticipated needs for value.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that may be used to interact with the user. For example, a typical website may include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Figure 2:
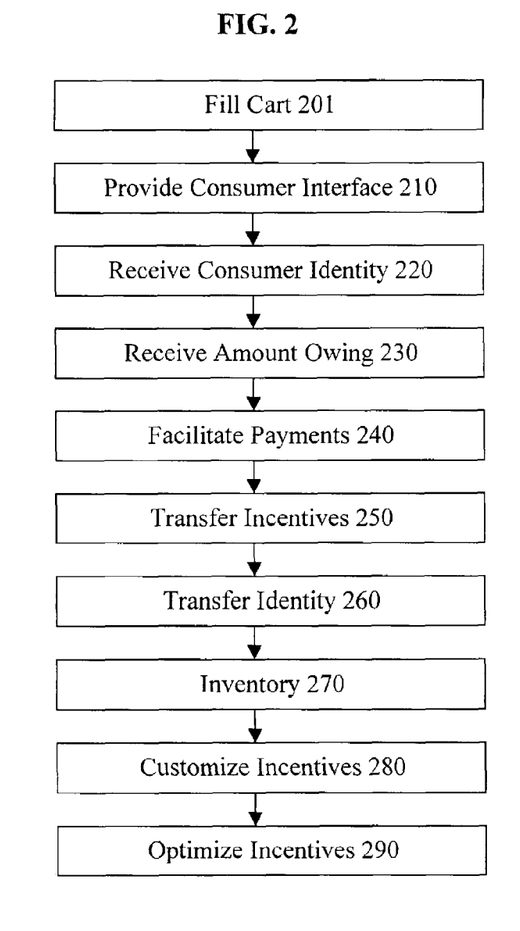
FIG. 2 illustrates an exemplary method for facilitating a transaction between a consumer and a merchant.

In a further aspect, as shown in FIG. 2, the present invention provides a method for facilitating a transaction between a merchant and a consumer. As shown in FIG. 2, one or more supply chain participant supplies goods and/or services to be placed in cart controlled by consumer (step 201). An exemplary method includes providing a consumer interface configured to emit a consumer identity signal configured to identify a consumer (step 210). A method also includes receiving the consumer identity signal (step 220), receiving an amount owing signal indicative of an amount owing from the consumer (step 230), and facilitating one or more payments between an account of the merchant and an account of the consumer (step 240).

In an exemplary embodiment, incentive signals are transmitted by one or more incentive administrator for receipt and storage by consumer interface (step 250). Upon checkout, then, consumer interface may transmit the incentive offer information as well as the consumer identity information to be received by settlement administrator (step 260).

In another exemplary embodiment, an inventory acquirer receives signals from goods contained in consumer's cart and produces inventory to be received and used by settlement administrator in settling the purchase of the goods (step 270). In another embodiment, an incentive administrator transmits incentive offers to be received by consumer interface and optionally receives consumer identity information and modified incentive offerings based on the consumer's identity (step 280). In yet another embodiment, a merchandizing administrator receives merchandizing information collected and transmitted by settlement administrator for use in modifying incentive offerings provided to incentive administrator for transmission to selected consumers (step 290). Accordingly, the method of the instant invention facilitates improvements in store layout, offers presented, pricing, inventory management, payment reconciliation.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneier, which is entitled "Applied Cryptography: Protocols, Algorithms, And Source Code In C," published by John Wiley & Sons (second edition, 1996), which is hereby incorporated by reference.

One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the consumer computer may employ a modem to occasionally connect to the internet, whereas the bank computing center may maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system may also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for facilitating a transaction between a merchant and a consumer comprising:
   a settlement administrator configured to receive a consumer identity signal from a consumer device, wherein said consumer device is configured to emit said consumer identity signal via a first radio frequency, said consumer identity signal configured to identify said consumer and provide consumer payment information;
   wherein said settlement administrator is further configured to receive an amount owing signal indicative of an amount owing from said consumer, wherein said amount owing signal is based at least in part on a second radio frequency signal emanating from inventory associated with said consumer; and
   wherein said settlement administrator is further configured to facilitate a payment between an account of said merchant and an account of said consumer upon receipt of said consumer identity signal and said amount owing signal.

2. The system of claim 1, wherein said consumer device is further configured to receive and retain an offer signal indicative of an incentive offer.

3. The system of claim 2, wherein said consumer device is further configured to emit said offer signal.

4. The system of claim 3, wherein said offer signal is based on at least one of age of said consumer, gender of said consumer, purchasing history of said consumer, time occupied by said consumer inside an establishment of said merchant, path traversed by said consumer inside an establishment of said merchant, economic information regarding said consumer and population information.

5. The system of claim 1, wherein said settlement administrator is further configured to receive an offer signal indicative of an incentive offer.

6. The system of claim 5, wherein said payment is based at least in part on said offer signal.

7. The system of claim 1, further comprising an incentive administrator configured to emit an offer signal indicative of an incentive offer.

8. The system of claim 7, wherein said incentive administrator is configured to receive a consumer identity signal and wherein said incentive offer is based at least in part on said consumer identity signal.

9. The system of claim 7, further comprising a merchandizing administrator in communication with said settlement administrator and said incentive administrator;
   wherein said settlement administrator is further configured to provide merchandizing information to said merchandizing administrator;
   wherein said merchandizing administrator is configured to receive said merchandizing information and to provide incentive information to said incentive administrator; and
   wherein said incentive offer is based at least in part on said merchandizing information.

10. The system of claim 1, further comprising an inventory acquirer in communication with said consumer device, wherein said inventory acquirer is configured to determine inventory information based on said second radio frequency signal emanating from said inventory.

11. The system of claim 10, wherein said inventory information comprises at least one of type of said inventory, price of said inventory, amount of said inventory, location of said inventory, consumer tracking information, relation of said inventory with respect to other inventory, frequency of purchase of said inventory, relation of said inventory to an incentive offer, and radio frequency tag information.

12. The system of claim 10, wherein said inventory acquirer is a cart.

13. The system of claim 1, wherein said first radio frequency and said second radio frequency are at least one of identical and different.

14. A method for a settlement administrator to facilitate a transaction between a merchant and a consumer comprising:
   receiving a consumer identity signal from a consumer device, wherein said consumer identity signal includes a first radio frequency and identifies said consumer and provides consumer payment information;
   receiving an amount owing signal indicative of an amount owing from said consumer, wherein said amount owing signal is based at least in part on a second radio frequency signal emanating from consumer selected inventory; and
   facilitating a payment between an account of said merchant and an account of said consumer.

15. The system of claim 1, further comprising a consumer tracker, wherein said consumer tracker is configured to receive said consumer identity signal, and wherein said consumer identity signal includes at least one of consumer incentive information, consumer payment information, consumer path information and consumer location information.

* * * * *